Aug. 4, 1953   J. D. NAILLON   2,647,646
TELESCOPING CARRIER FOR HANDLING BRICKS AND THE LIKE
Filed Sept. 8, 1947   10 Sheets-Sheet 1

Inventor
Jacob D. Naillon

Aug. 4, 1953        J. D. NAILLON           2,647,646
        TELESCOPING CARRIER FOR HANDLING BRICKS AND THE LIKE
Filed Sept. 8, 1947                         10 Sheets-Sheet 4

Aug. 4, 1953     J. D. NAILLON     2,647,646
TELESCOPING CARRIER FOR HANDLING BRICKS AND THE LIKE
Filed Sept. 8, 1947     10 Sheets-Sheet 7

Inventor
Jacob D. Naillon

Aug. 4, 1953  J. D. NAILLON  2,647,646
TELESCOPING CARRIER FOR HANDLING BRICKS AND THE LIKE
Filed Sept. 8, 1947  10 Sheets-Sheet 8

INVENTOR.
Jacob D. Naillon

Aug. 4, 1953            J. D. NAILLON            2,647,646
TELESCOPING CARRIER FOR HANDLING BRICKS AND THE LIKE
Filed Sept. 8, 1947            10 Sheets-Sheet 9

INVENTOR.
Jacob D. Naillon

Aug. 4, 1953    J. D. NAILLON    2,647,646
TELESCOPING CARRIER FOR HANDLING BRICKS AND THE LIKE
Filed Sept. 8, 1947    10 Sheets-Sheet 10

INVENTOR.
Jacob D. Naillon

Patented Aug. 4, 1953

2,647,646

UNITED STATES PATENT OFFICE 2,647,646

TELESCOPING CARRIER FOR HANDLING BRICKS AND THE LIKE

Jacob D. Naillon, Oakland, Calif.

Application September 8, 1947, Serial No. 772,772

28 Claims. (Cl. 214—6)

This invention relates to the art of handling materials, and is more particularly, concerned with a telescoping carrier and spacing machine suitable for handling bricks and for other operations. While the telescoping carrier and spacing machine finds especial application in the handling of bricks and similar solid objects which are manufactured in standardized sizes, it is not limited thereto but may be adapted to other uses, such as the handling of boxes and the like.

The embodiment of the invention described in this specification is designed particularly for handling masonry bricks and is intended to be used in conjunction with the adjustable rack described in my patent application Serial No. 772,771 filed concurrently with the instant application now Patent 2,595,599. In the manufacture of such bricks, concrete blocks or bricks are formed by means of suitable molds and placed on pallets or hacking boards. The loaded pallets are then moved into a curing chamber wherein the bricks are subjected to live steam for several hours, resulting in rapid curing. The pallets are thereafter removed from the curing chamber and the bricks are unloaded and stacked in a storage yard.

During the movement of the loaded pallets into and out of the curing chamber they are stacked in tiers on a rack suspended from a monorail, such as the rack described in the afore-mentioned patent application. The instant invention is concerned with the operations of unloading the bricks from the pallets on the rack and stacking the bricks in a storage yard. While the apparatus described in this application is designed to unload bricks from pallets supported in such a rack, it is evident that it may be used also for unloading bricks or other rigid objects from shelves or from pallets on other forms of stationary or movable racks.

Bricks are frequently manufactured at the same plant in different sizes, often having only one dimension altered. Thus, in the case of concrete masonry bricks, two common sizes are 8 in. x 8 in. x 16 in., and 4 in. x 8 in. x 16 in. The bricks are placed with their 8 in. x 16 in. faces on the pallets, regardless of the third dimension, so that the same number of large or small bricks are placed on a pallet. When the pallets are loaded with small bricks it is possible to stack twice as many pallets in a vertical tier of a given height as when they are loaded with large bricks, and this procedure permits the handling of the greatest number of bricks in one operation with equipment of given dimensions.

It is, therefore, an important object of this invention to provide an improved carrier for unloading bricks from one or more vertical tiers of pallets regardless of whether the tier or tiers contain a large number of pallets loaded with small bricks and closely spaced vertically, or a small number of pallets loaded with either small or large bricks and spaced farther apart vertically. Ancillary thereto, it is an object to provide a carrier suitable for handling mixed loads, i. e., for unloading bricks from pallets some of which may be spaced farther apart vertically than others and may be loaded either with small or large bricks.

When the bricks are placed on the pallets and the pallets are mounted in racks for curing and movement the bricks are spaced apart vertically, laterally and longitudinally. To conserve space in the storage yard it is necessary to decrease these intervals. It is another important object of this invention to decrease such intervals by an improved telescoping carrier for unloading and stacking the bricks in the yard.

Another object of the invention is to provide a device of the type described which is provided with a plurality of gripping or clamping arms for engaging the bricks on one or more vertical tiers of pallets, said arms being mounted in opposed, movable frames located on opposite sides of the tier or tiers, and arranged for movement toward each other for moving the arms into the intervals between the rows of bricks on the pallets.

Another object is to provide a device of the type described having a plurality of gripping arms for engaging the bricks, the arms being movably mounted on a frame or on a pair of opposed, movable frames, in which the arms at different levels are vertically movable with respect to each other to decrease the vertical interval between the layers of bricks.

Ancillary to the foregoing object, it is an object to provide a device of the type described wherein the movable frame or frames are adapted to be telescoped vertically when the carrier is lowered to the ground, whereby the vertical interval between the bricks can be decreased gradually or progressively and without dropping the bricks.

Another object is to provide a device of the type described having a plurality of pairs of clamping or gripping arms spaced apart horizontally along a frame for engaging bricks in several vertical tiers simultaneously, (which bricks may be on separate vertical tiers of pallets, or on a single vertical tier of pallets large enough to support several bricks in a row parallel to the frame) wherein the pairs of arms in each horizontal row may be moved together horizontally in a direction parallel to the frame for decreasing the horizontal longitudinal interval between the tiers of bricks.

Another object is to provide a carrier of the type described having a pair of opposed frames on opposite sides of the stack of bricks and gripping arms on said frames extending inwardly toward each other, wherein the frames are arranged to be moved laterally toward each other after the carrier has been moved away from the pallets (or after the pallets have been moved away from the carrier) to decrease the horizontal lateral interval between the bricks carried by the gripping arms of one frame and the bricks carried by the gripping arms on the other frame.

Still further objects are to provide an improved telescoping carrier and spacing machine which is adapted to be supported from an overhead monorail, bridge crane, or similar trackway for movement of the bricks to a desired location in the brick storage yard; to provide a device in which the power required to move the gripping arms to their engaging positions and for clamping the gripping arms to the bricks is easily applied by means of handwheels and/or chains; and to provide a device which is simple to operate by comparatively unskilled personnel.

With these and other objects in view, which will become obvious in part and be pointed out in part in the course of the following description of the elements and applications of principles constituting the invention, reference is made to the accompanying drawings forming a part of the specification and illustrating a preferred specific embodiment of the invention, wherein:

Figs. 27 and 28 are plan and front elevation views, respectively, of the same bricks after the closing of the intervals; Fig. 27 showing the bricks after the longitudinal intervals have been closed, but before the lateral intervals have been closed, and Fig. 28 showing the bricks after all intervals have been closed.

Figure 25:
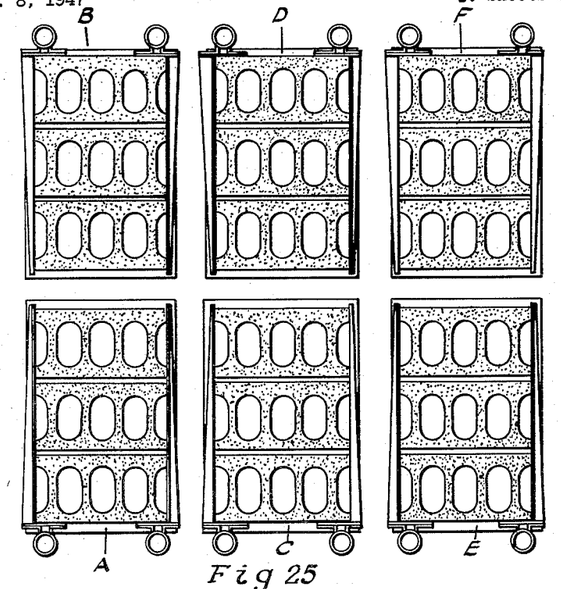
Fig. 25 is a plan view of a lot of spaced bricks prior to the operations performed thereon by my carrier but with the gripping arms in place.
Figure 26:
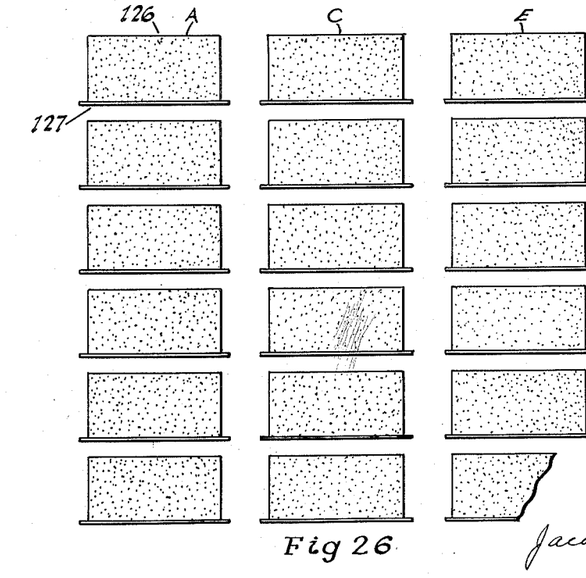
Fig. 26 is a side elevation view of the bricks shown in Fig. 25 without the gripping arms.

According to the present invention a lot of bricks supported on trays or pallets and having vertical, lateral and longitudinal intervals, such as shown in Figs. 25 and 26, is lifted from the pallets by gripping arms; the former supports for the bricks are then removed. The longitudinal intervals are then reduced by shifting the tiers of bricks while engaged by the gripping arms. The bricks are then lowered to the ground, if desired after moving the lot as a unit to a suitable place in a storage yard, so as to close the vertical intervals progressively beginning at the bottom. The gripping arms are next unclamped from the bricks and, if desired, the lateral intervals are reduced or eliminated by engaging the outermost bricks and pushing them together.

The invention provides a telescoping carrier and spacing machine for performing the foregoing operations. For convenience, the device will be described in five subdivisions before describing its operation.

*I.—Supporting structure*

Referring to the drawings, and particularly to Figs. 1–8, and 14–18, the carrier comprises a rigid supporting structure with a telescoping foot assembly, supporting a pair of laterally movable or translatable side frames. The rigid structure is formed, at the top, of a rectangular, horizontal frame having transverse channel beams 1 and longitudinal angle beams 2, braced at the corners by horizontal plates. A vertical carrying plate 3 is bolted at the center of each transverse beam 1 for attachment of a longitudinal lifting beam 4 by which the carrier may be suspended from a hoist and overhead monorail, or a bridge crane or the like. The line joining the plates 3 forms the longitudinal center line of the carrier and the weights are equally balanced on either side of this line. A leg is rigidly connected at each corner of the horizontal frame, the front legs being shown at 5 and the rear legs at 6. Sections of seamless tubing 7 are welded at the bottoms of the legs, each tubing having a vertical slot 7a.

A telescoping foot assembly connects the tubes 7 of each pair of legs on the same side of the center line. Each foot assembly comprises a horizontal channel beam 8 secured, at its ends, to vertical tubes 9 slidable within tubes 7 and secured therein by means of pins 10 extending through the slots 7a therein. While each front leg 5 is thus joined to its corresponding rear leg 6, the pair of legs on the right side is not joined to the other pair; this leaves a free space between the opposite sides, permitting the frame to be lowered over a rack loaded with bricks, as will be explained hereafter.

Tubular guide pieces 11 (see Figs. 7 and 8) are mounted parallel to the transverse beams 1 by means of supports 12 at the centers and supports 13 at the ends, there being four such guide pieces within the upper, rigid frame.

II.—Movable side frames

Each tubular guide piece 11 carries a slide 14; opposite slides on the front and rear are joined by main, horizontal tubular beams 15, there being one such tubular beam on each side of the center line. The slides have tubular collars surrounding the guides 11 and fitted for slidable movement along the guides; each guide has, further, a tubular portion at right angles to the guides for supporting the main beams 15. Each slide 14 carries an upper rack gear 16, stiffened and supported by an angle piece 17 welded thereto. Each rack gear and angle assembly passes through an aperture in a bent plate 18 having a short piece of angle 18a welded to the plate 18. The angle 17 fits over and rests on the angle 18a, and is thereby slidably supported at its outer end. (See Figs. 3, 4 and 5.)

The movable side frames comprise, each, one of the main tubular beams 15, a pair of slides 14 supporting the main beam, the upper rack gears 16 and angles 17 secured to said slides, and six hangers, together with the telescoping elements, a lower beam and lower rack gears, to be described. All hangers of the same side frame are slidably supported on the same beam 15 by means of bushings 19, welded to the upper end of the curved top hanger sections 20 of the respective hangers. The vertical, telescoping portion of each hanger comprises the following parts, shown in Figs. 8–11: A fixed tubular section 21 extending into the top section 20 and fixed thereto by a pin 22 to form a rigid, permanent connection; a first telescoping section 23, slidably mounted within the fixed section 21 and having a lower extension 23a in the form of a piece of tubing fitted into its lower end and welded thereto; a second telescoping section 24 slidably mounted about the extension 23a and having a narrower, welded extension 24a; third and fourth telescoping sections 25 and 26, provided with narrower, welded extensions 25a and 26a, respectively, and constructed identically with section 24; and a fifth telescoping section 27 slidably mounted about extension 26a. Each hanger carries twelve gripping arms, numbered 28 to 39, inclusive, from top to bottom: arms 28, 30, 33, 35, 37 and 39 are secured directly to the sections 21, 23, 24, 25, 26 and 27, respectively, as described more particularly hereafter. The lowest arms on the rearmost hangers are of a different construction and are indicated as 39a, as explained hereafter. The remaining arms 29, 31, 32, 34, 36 and 38 are carried by bushings 40, 41, 42, 43, 44 and 45, respectively, these bushings being vertically slidable along sections 21, 23, 24, 25, 26 and 27, respectively. The telescoping sections and bushings are secured by pins 46, 47, 48, 49, 50 and 51. Pin 46 has a light drive fit with section 21 and carries a pair of outer pin bushings 52 in engagement with vertical slots on opposite sides of the bushing 40, a pair of outer pin bushings 52a in engagement with vertical slots on opposite sides of section 23 and a central, elongated pin bushing 53 to keep inner pin bushings 52a in place. Pin 47 has a light drive fit with section 23 and carries a pair of pin bushings 54 in engagement with vertical slots on opposite sides of bushing 41. Pin 48 has a light drive fit with the lower extension 23a and carries four pin bushings 55, in engagement with vertical slots on opposite sides of section 24 and with vertical slots on opposite sides of bushing 42. Pins 49, 50 and 51 are fitted as described for pin 48, having light drive fits with the extensions 24a, 25a and 26a, respectively, and engaging slots in the respective dependent telescoping sections and the respective bushings 43, 44 and 45, through pin bushings like the bushings 55. The pin bushings 52 to 55 are loosely fitted on their supporting pins, so as to permit them to roll about the pins and along the sides of the slots as the slotted sections or bushings are displaced vertically with respect to the pins.

As a result of the foregoing construction, the arms 28 to 39 are vertically spaced as shown in the drawing when the hanger is suspended from the beam 15 and the lower end of the hanger is urged away from the center of the carrier by the lower rack gears, to be described. The arms are mounted so as to form alternate short and long vertical intervals, as shown. When the hanger is lowered to the ground without a load the sections telescope progressively from the bottom as follows: Upon contact of section 27 and/or arm 39 with the ground, the continued downward movement of the superior sections causes the section 27 to telescope about the extension 26a until the pin bushings on pins 51 engage the bottom ends of the slots in the section 27. The section 26 then comes to rest and is similarly telescoped about the extension 25a to the extent permitted by the pin bushings on 50. This telescoping action continues until section 23 is telescoped with respect to the fixed section 21.

As is explained more particularly hereafter, the gripping arms are adapted to engage a variable number of bricks, e. g., from six layers of large bricks to twelve layers of small bricks, it being understood that while the gripping is effected by bringing arms on adjacent, cooperating hangers together, the action of only a single hanger is herein described. When six layers of large bricks are engaged, each pair of closely spaced arms, e. g., the arms 28 and 29, engage the same brick or layer of bricks, and vertical intervals are left between the layers of bricks. It is desirable, when depositing the bricks to form a stack on the ground, to close these vertical intervals progressively from the bottom before unclamping the bricks. This is effected by the telescoping action previously described, with the difference that the downward movements of the various sections is limited by the vertical dimensions of the bricks, instead of by the heights of the slots: When the lowest layer of bricks, supported and engaged by the lowest pair of arms 38 and 39, comes to rest on the ground, these arms, together with the lowest section 27 and the bushing 45 come to rest; the superior parts, including extension 26a and pins 51, continue to descend until the next lowest layer of bricks, supported by arms 36 and 37, rests on the lowest layer, thereby stopping the downward movement of the arms 36 and 37, together with the section 26 and the bushing 44; the upper four layers continue downward until the layer supported by the arms 34 and 35 rests on the bricks held by the arms 36 and 37. This action is continued until all sections are similarly telescoped and all vertical intervals between the bricks have been eliminated.

When the device is loaded with twelve layers of small bricks, each arm on any one hanger is in engagement with bricks of a different layer; there is also in this instance a vertical interval between each layer and the layer immediately above, necessitating eleven successive telescoping movements instead of the five previously described. This is made possible by mounting some of the arms on the bushings 40 to 45, the telescoping action being as follows: As the hanger is lowered, the lowest layer of bricks first comes to rest on the ground, stopping the downward movement of the arm 39 and section 27; as the upper eleven layers continue to descend the extension 26a is telescoped within the section 27 and the bushing 45 slides downwardly with respect to the section 27, it being noted that this bushing is supported by the pin 51 which is carried by the extension 26. When the next to the lowest layer of bricks comes to rest on the lowest layer the downward movement of the arm 38 and bushing 45 is stopped. As the section 26 continues to descend, pin 51 moves downward in the slot in bushing 45 and the interval immediately above the layer of bricks engaged by the arm 38 is closed until the arm 37 and section 26 come to rest; the section 25 and bushing 44 continue to move downward, closing the interval between the bricks carried by arm 37 and those carried by arm 36. This telescoping action is continued progressively until all twelve layers are resting on the ground.

The lowest section 27 on each hanger carries a fitting 56 welded thereto through web 56a. These fittings 56 are provided with collars having horizontal axes and arranged to have a sliding fit with a longitudinal tube 57 connecting all six hangers and forming a lower lateral brace for maintaining the telscoping sections vertical. A lower rack gear 58 is provided at each end of the tube 57, the lower rack gears being parallel to and directly beneath the upper rack gears 16.

Figures 13, 14:
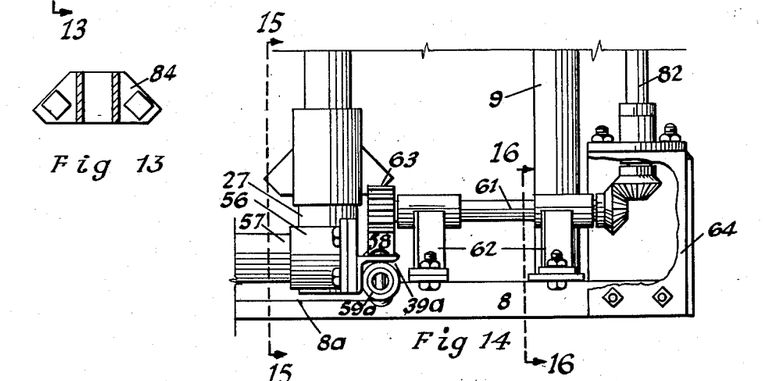
Fig. 13 is a sectional view taken on line 13—13 of Fig. 12.
Fig. 14 is an enlarged, fragmentary detail view of the lower right rear corner, looking from the right.
Figure 15:
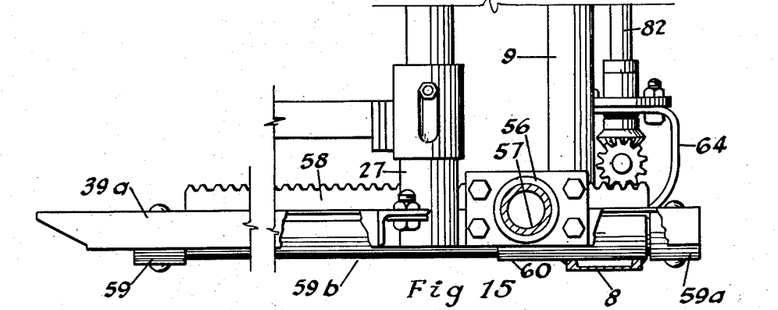
Figs. 15 and 16 are sectional views taken on lines 15—15, and 16—16, respectively, of Fig. 14.
Figure 16:
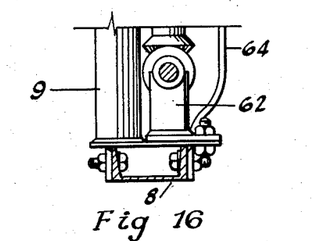

Referring particularly to Figs. 14–16, the rear rack gear 58 on each side frame is welded to the lowermost arm 39a of the rearmost hanger. This arm differs from the other arms (described particularly in section IV) in that it extends laterally beyond the hanger away from the center of the device. The arm 39a is riveted to a pair of sleeves 59 and 59a on opposite sides of the hanger section 27. A tube 59b is fixed in the sleeves 59 and 59a and fastened rigidly thereto. A sleeve 60 is slidably mounted on the tube 59b between the sleeves 59 and 59a and welded to the channel beam 8 in a notch 8a. (See Figs. 4, 14 and 15.) By the foregoing construction the tube 59b and the sleeves 59 and 59a can be moved laterally with respect to the sleeve 60 and channel beam 8 as the side frame is moved laterally.

Figure 17:
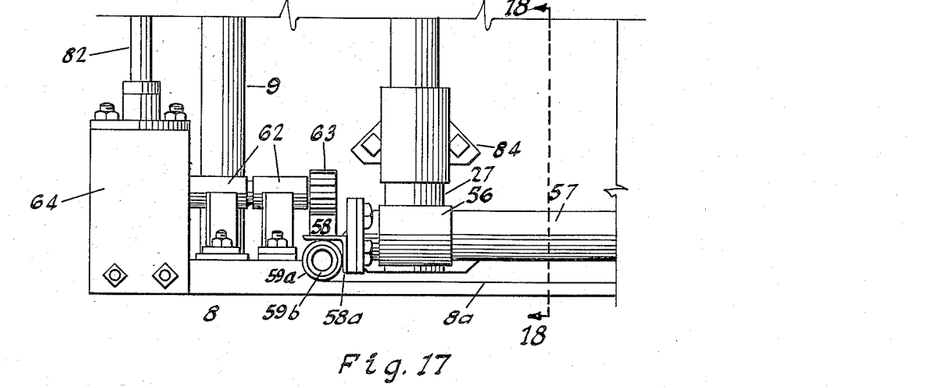
Fig. 17 is an enlarged, fragmentary view of the lower right front corner, looking from the right.
Figure 18:
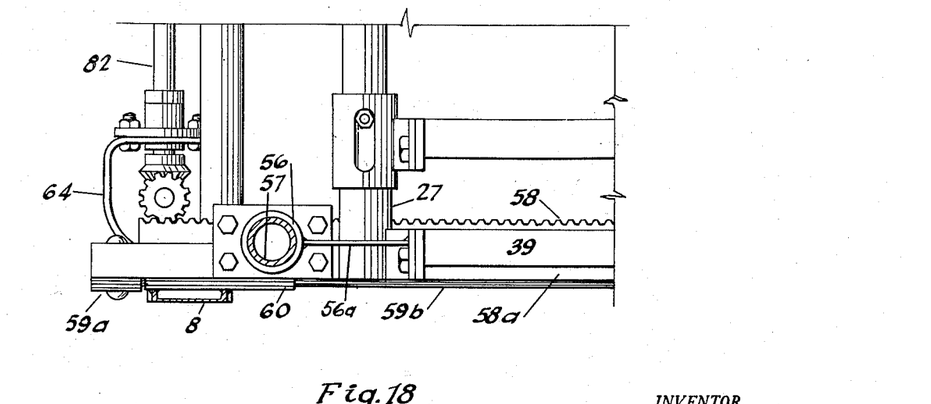
Fig. 18 is a sectional view taken on line 18—18 of Fig. 17.

The construction at the front end of the tube 57 is shown in Figs. 17 and 18. It differs from the rear end in that the rack gear 58 is not fixed to the hanger or hanger arm 39, but is, instead, welded to an auxiliary supporting angle 58a. The angle 58a is similar to and of the same length as the arm 39a but is not connected to any hanger; instead, it is connected to the forward end of the tube 57. It carries sleeves 59 and 59a, connected by a tube 59b, the latter being slidable within a sleeve 60, all as previously described for the rear corner. It will be seen that the tube 57 is, by this construction, positioned laterally at its forward end by the angle 58a and the forward rack gear 58, and at its rear end by the fitting 56, section 27, arm 39a and the rear rack gear 58.

At the front and rear separate short shafts 61 are journalled in supports 62 on the channel beam 8; these shafts carry lower pinion gears 63 meshing with the front and rear lower rack gears 58 as shown in Fig. 14. A miter gear box 64 is bolted to each end of each channel beam 8; each gear box 64 has miter gears driven by vertical shafts arranged to drive the short shafts 61 and the pinion gears 63. The upper rack gears 16 are driven by pinion gears 65. As described more particularly in the following section of this specification, the pinion gears 63 and 65 are mounted on shafts journalled in the supporting structure and are interconnected to move in synchronism, whereby the lower and upper rack gears 58 and 16 may be translated by parallel movements transversely with respect to the structure. The movable side frame may, thereby, be translated toward or away from the center of the telescoping carrier while maintaining the telescoping sections vertical and the arms horizontal.

III. Side frame opening and closing system

The supporting rigid frame carries at its upper front left corner a sprocket 66 mounted on a shaft 67 extending through a reduction and reversing gear box 68 and journalled therein. (See Figs. 2 and 6.) It is driven by an endless link chain 69 which may be pulled manually. A sprocket 70 is fixed to the other end of shaft 67 and is driven at the same speed and in the same direction as sprocket 66. The gear box 68 has two output shafts interconnected by gearing to shaft 67 for rotation at half speed of shaft 67: A vertical shaft 71 and a longitudinal shaft 72 parallel to and below the shaft 67. (See Fig. 5.) The latter is journalled in supports carried by the beam 2 and carries and drives the upper pinion gears 65 for the left side frame, meshing with the rack gears 16 thereof at the front and rear. The vertical shaft 71 is telescoped with respect to a splined shaft 73 carried by the miter gear box 64. The splined connection permits relative vertical motion between the shafts 71 and 73 as the tubes 9 and beams 8 move vertically with respect to the rigid legs 5 and 6. The gear box 64 is fixed on the channel beam 8 and contains miter gears for driving shaft 61 and the lower, front pinion gear 63.

The rear end of the horizontal shaft 72 is connected by miter gears 74 to a similar pair of vertical, splined shafts at the rear, left corner; they drive miter gears similar to those in gear box 64 at the bottom for driving the lower, rear pinion gear 63. It will be seen that when sprocket 66 is rotated by means of the chain 69 the two upper pinion gears 65 and the two lower pinion gears 63 of the left side frame are rotated in synchronism at half of the speed of the sprocket and in an opposite direction, thereby moving the four rack gears 16 and 58 the same distances and translating the left frame.

For translating the right side frame a chain drive is provided above the front, transverse beam 1. It comprises a pair of sprockets 75 and 76 fixed to a common spindle mounted on beam 1 and driven by a roller chain 77 meshing with sprockets 70 and 75; and a sprocket 78, fixed to a longitudinal shaft 79, and driven from sprocket 76 by a roller chain 80. Sprocket 78 is twice as large as sprocket 76, while sprockets 70 and 75 are of the same size, whereby the shaft 79 is rotated at half the speed of the sprockets 66 and 70, i. e., at the same speed, but in the opposite direction as, shaft 72. The shaft 79 carries and drives the upper pinion gears 65 for the right side frame. Miter gears 74a at the front and rear ends of the shaft 79 are provided to drive vertical shafts 81 at the front and rear of the carrier, each shaft 81 being connected to a splined shaft 82 for relative vertical motion with respect thereto. The splined shafts 82 are journalled in miter gear boxes 64 for driving the pinion gears 63 of the right side frame. The operation of the four pinion gears for the right side frame is the same as that previously described for the left frame. It should be noted that, because of the reversing action of the gear box 68, the rotation of the sprocket 66 causes the movable frames to move simultaneously toward each other or apart, whereby the loads on the side frames are maintained at the same distances from the center line.

IV.—Clamping mechanism

The clamping mechanism comprises the gripping arms on the hangers, and the mechanical system for moving the arms on opposite sides of a tier of bricks together or apart, the latter being herein also referred to as the actuating means. In the embodiment illustrated six hangers are provided on each side frame, whereby each frame has three pairs of cooperating hangers.

Figure 1:
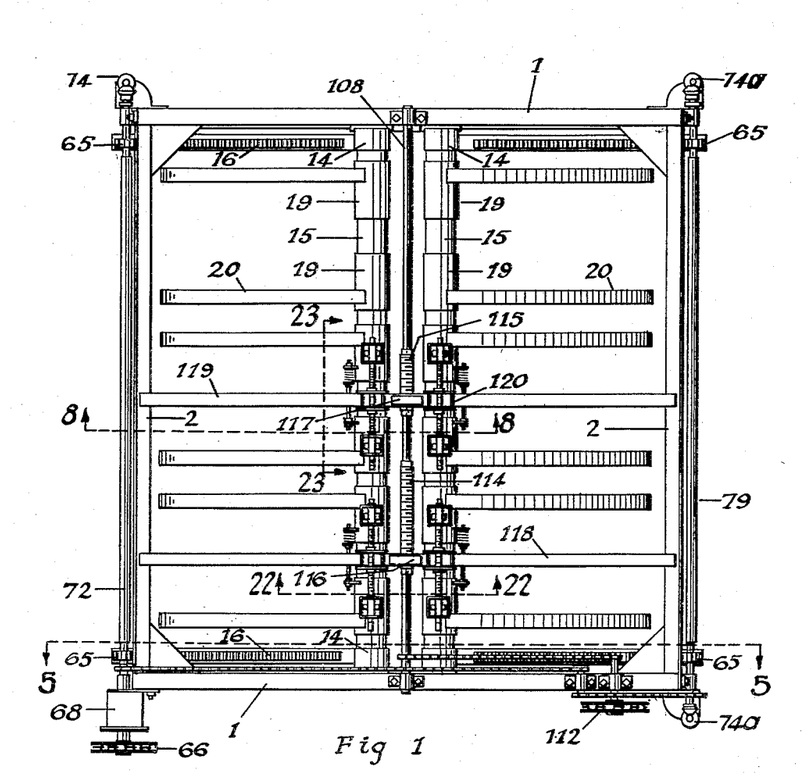
Fig. 1 is a plan view of the carrier with the side frames in the closed position.
Figure 2:
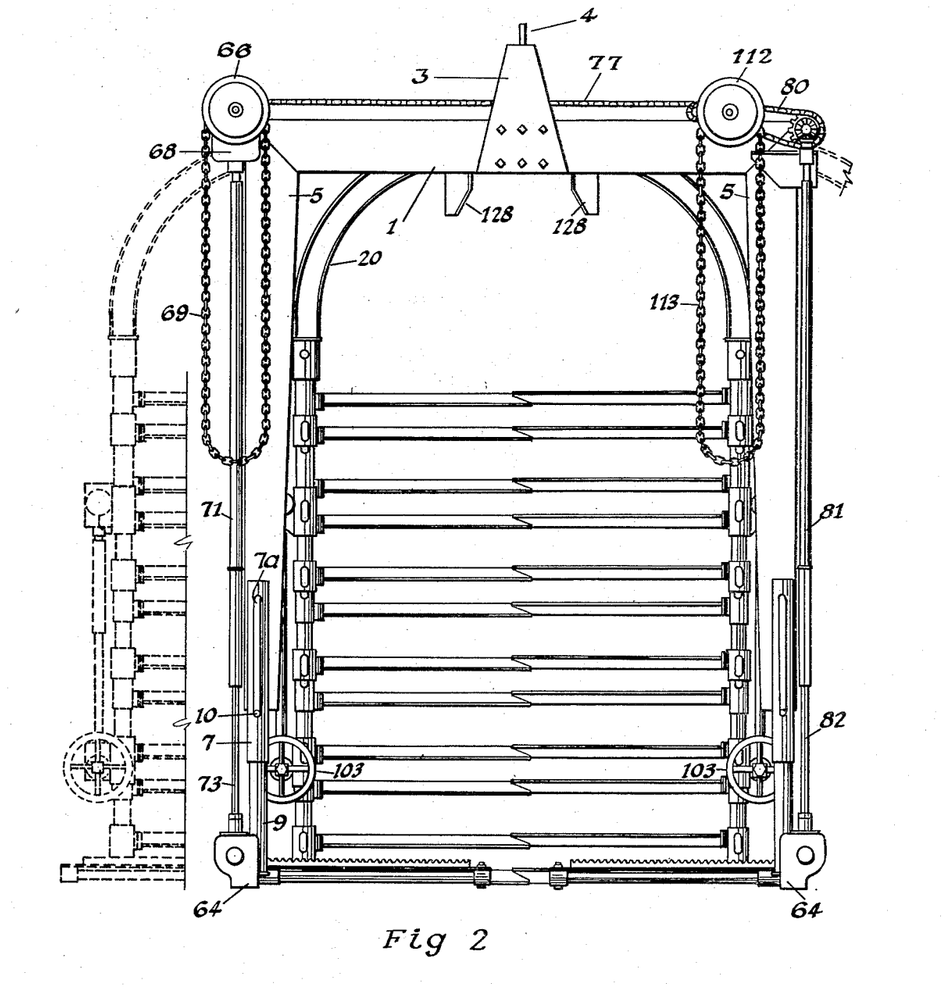
Fig. 2 is a front elevation view of the device, the open position of one of the side frames being shown in dotted lines.
Figure 3:
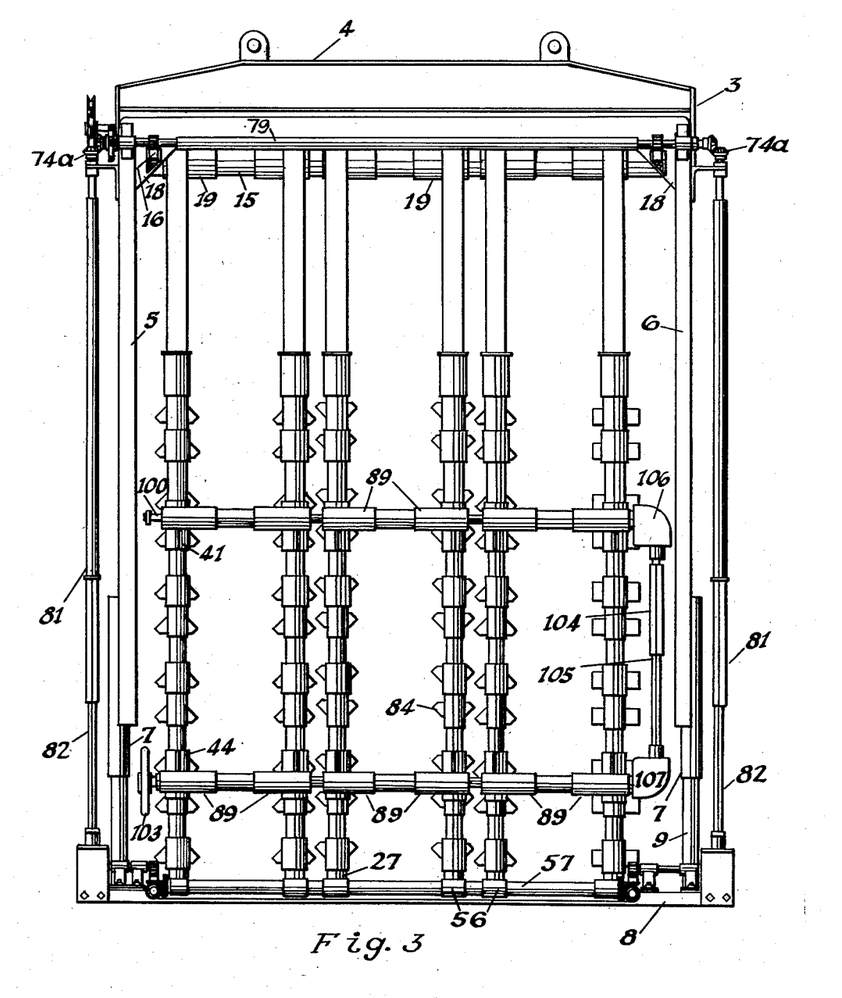
Fig. 3 is a side elevation view of the right side.
Figure 4:
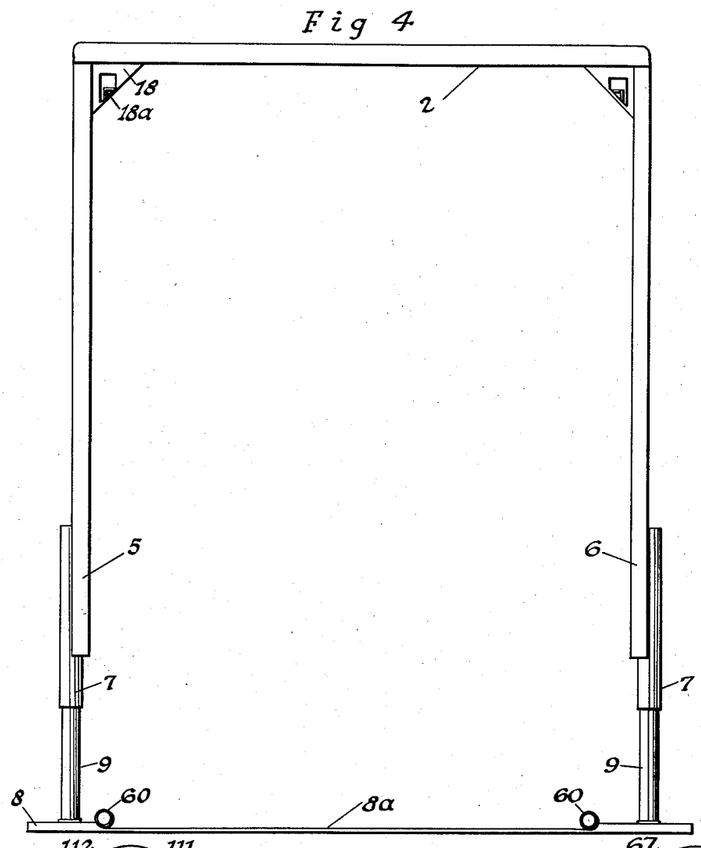
Fig. 4 is a side elevation of the right side of the supporting structure.
Figure 5:
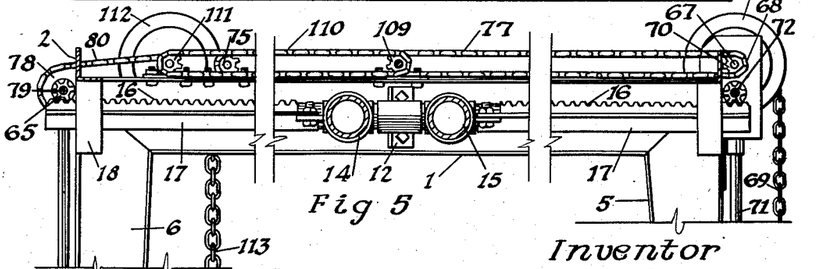
Fig. 5 is an enlarged sectional view, taken on line 5—5 of Fig. 1, showing the upper portion of the supporting structure.
Figure 6:
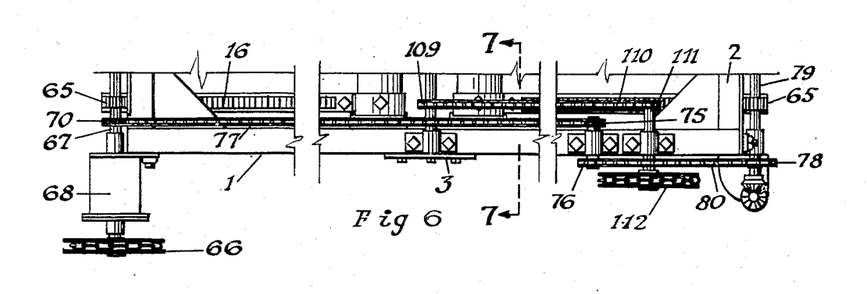
Fig. 6 is an enlarged fragmentary plan of the front portion, showing parts illustrated in Fig. 5.
Figure 7:
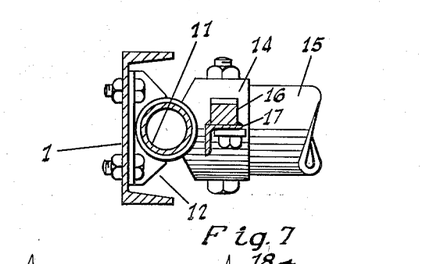
Fig. 7 is a section view taken on line 7—7 of Fig. 6.
Figures 8, 9, 10, 11:
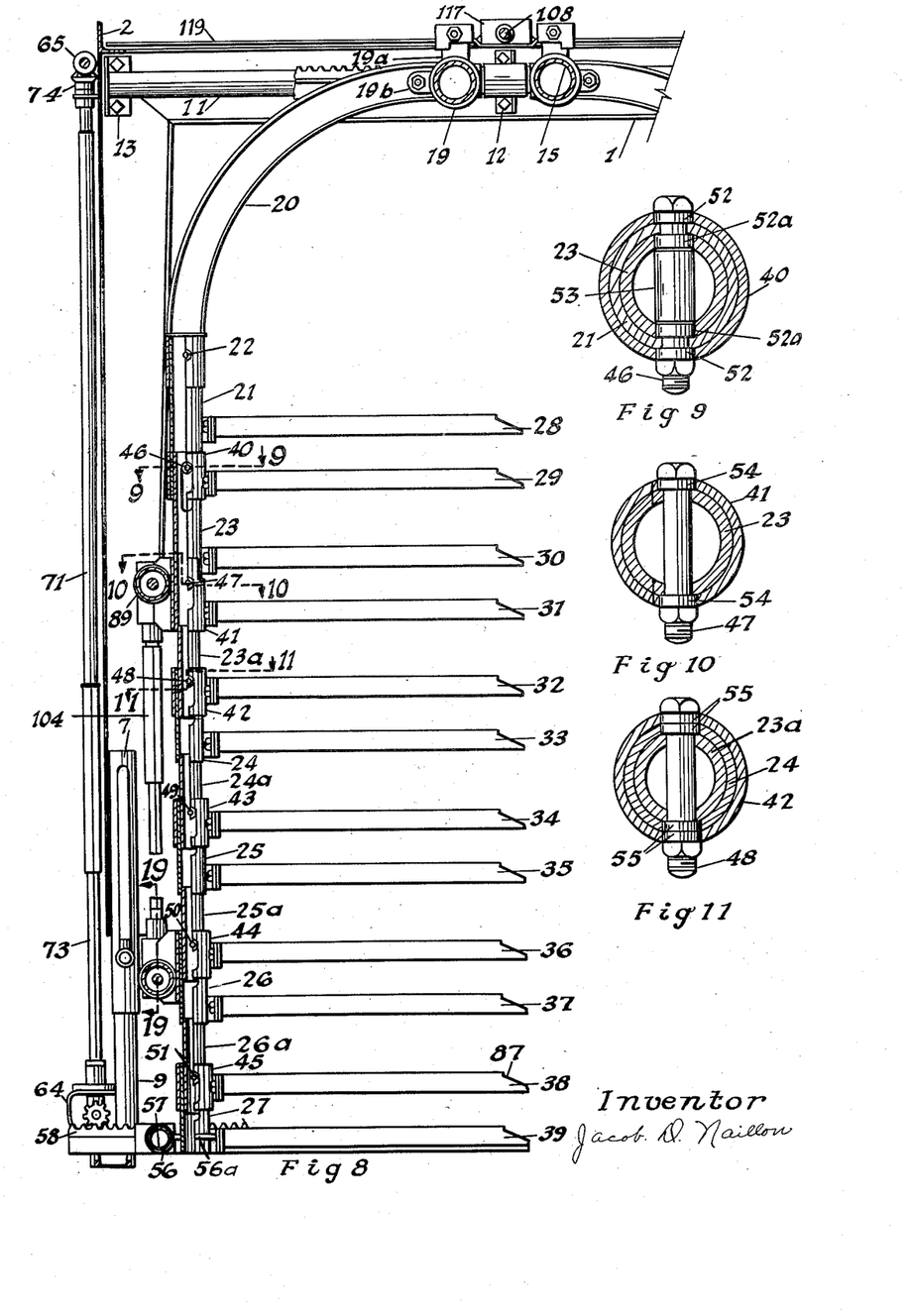
Fig. 8 is an enlarged section on line 8—8 of Fig. 1, showing one telescoping hanger the right half of the bushings and telescoping sections being shown in elevation.
Figs. 9, 10, and 11 are sectional views taken on lines 9—9, 10—10, and 11—11, respectively, of Fig. 8, on an enlarged scale.

The gripping arms 28 to 39 are similarly constructed on all hangers, except for the lowest arms 39a on the rearmost hangers but are alternately reversed, as follows: The arms on the front hangers and on the third and fifth hangers have flat, vertical surfaces facing toward the rear; the arms on the second, fourth and sixth hangers have such surfaces facing toward the front. Moreover, as is shown in Fig. 3, the hexagonal supporting brackets 84 on the two middle hangers are positioned with their longer edges toward the top, while those on the other hangers (except the rearmost hanger, which have rectangular fittings) are inverted, to permit the second hanger to be moved closer to the third hanger, and the fourth hanger to be brought nearer to the fifth hanger during the longitudinal spacing operation. Finally, as shown in Figs. 2 and 8, the ends of the arms on the left frame have their upper surfaces inclined or chamfered, while those on the right frame have their ends shaped to overhang the opposed arms of the left frame, whereby the arms may be moved together with an overlap during the lateral spacing operation.

Figure 12:
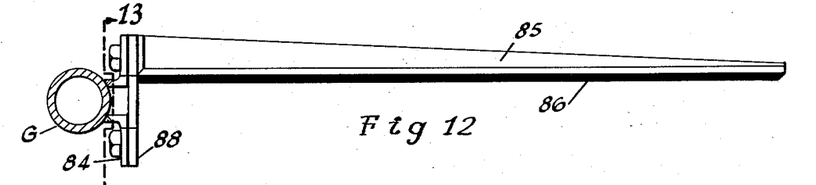
Fig. 12 is a plan view of a gripping arm.

Referring to Figs. 12 and 13, each gripping arm is formed of an angle 85 having its vertical, outer face covered with a resilient material 86, such as synthetic rubber of good wear resisting quality or the like, bonded to the metal by an adhesive or by other means. This covering is applied to engage the bricks and should be selected to have a high coefficient of friction. The inner ends of the arms (i. e., the ends away from the hangers) are chamfered as shown at 87. (See Fig. 8.) The outer ends are welded to hexagonal supporting plates 88, which are, in turn, bolted to brackets 84. The brackets 84 are formed of two complementary fittings welded to a section or to a bushing of the hanger. Thus, the piece G shown in Fig. 12 may be one of the sections 21 to 27, or one of the bushings 40 to 45. The supporting plates 88 and brackets 84 for the arms on the rearmost hangers are rectangular instead of hexagonal. The lowest arms 39a on the rearmost hangers differ only in that they are bolted to sections 27 so as to extend outwardly beyond the hanger to form a support for the sleeve 59a.

Figure 19:
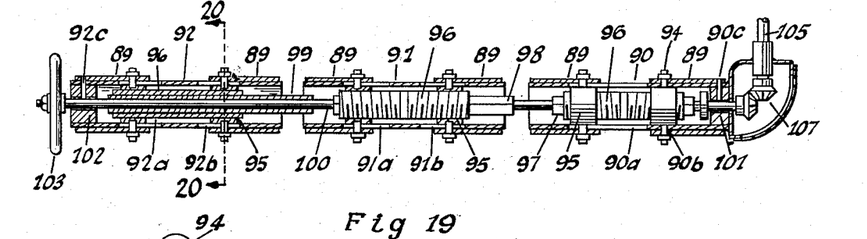
Fig. 19 is an enlarged sectional view of the clamping mechanism, taken on line 19—19 of Fig. 8.
Figures 20, 21, 23:
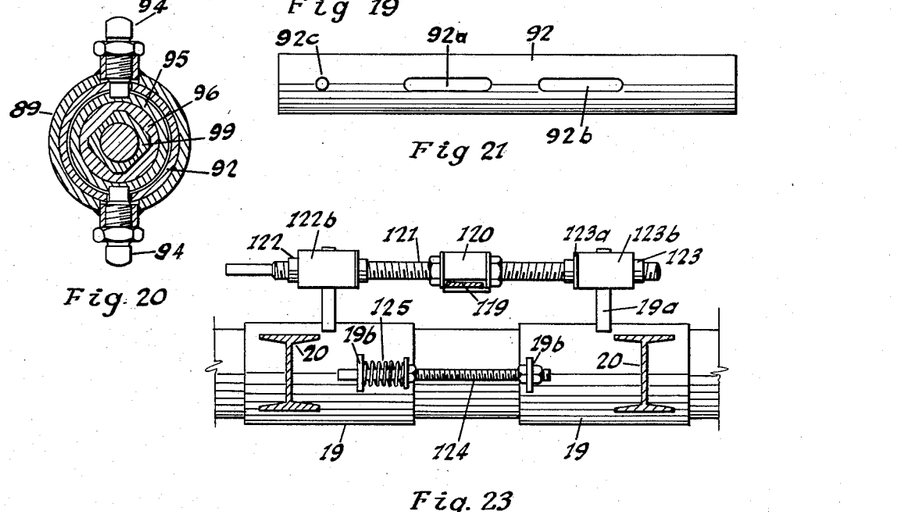
Fig. 20 is an enlarged sectional view taken on line 20—20 of Fig. 19.
Fig. 21 is an elevation view of one of the connecting tubes.
Figs. 22 and 23 are enlarged fragmentary sectional views, taken on lines 22—22 and 23—23, respectively, of Fig. 1, showing details of the longitudinal spacing mechanism.
Figure 22:
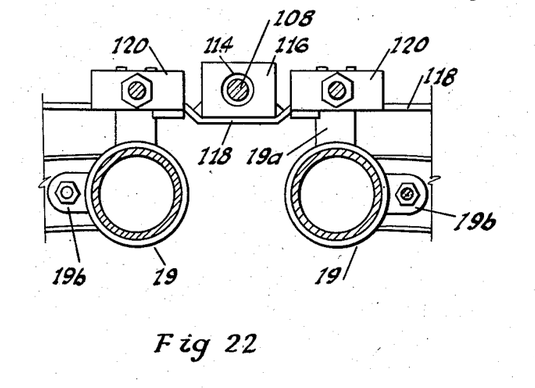

The telescoping bushings 41 and 44 on each hanger have horizontal, longitudinal bushings 89 welded thereto. As shown particularly in Figs. 19-21, connecting tubes 90, 91 and 92 are slidably mounted within the lower bushings 89 on the bushings 44, each tube extending through the two bushings 89 of a pair of cooperating hangers. The connecting tube 90 has a pair of longitudinal slots 90a on opposite sides, a pair of holes 90b, also on opposite sides, and an oil hole 90c on one side. The connecting tube 91 has two pairs of longitudinal slots 91a and 91b, and connecting tube 92 has two similar pairs of slots 92a and 92b, on opposite sides of the tubes; tube 92 has, in addition, an oil hole 92c on one side. Screws 94 extend from opposite sides of the bushings 89, passing through the holes 90b or the slots 90a, 91a, 91b, 92a or 92b, and engaging internally threaded stub tubes 95, there being one tube 95 for each bushing 89. The tubes 95 are alternately provided with right hand threads and left hand threads. An externally threaded clamping screw 96 engages each pair of tubes 95, each clamping screw having right hand threads at one end and left hand threads at its other end. The screws 96 have square bores and are slidably mounted on tubular shafts 97, 98 and 99, which are of progressively greater lengths, from rear to front, there being one such shaft for each screw 96. The shafts 97 to 99 are externally rectangular to drive the clamping screws 96 and are secured to an operating shaft 100 by means of taper pins not shown but of construction known per se. The operating shaft is journalled in a thrust bearing 101, mounted within the rearmost connecting tube 90 and secured by a press fit with tube 90; and in a bearing 102, mounted within the connecting tube 92 and secured by a press fit with tube 92. A handwheel 103 is fixed to the front of the operating shaft.

The upper bushings 89 on the bushings 41 are similarly provided with slidable connecting tubes and the mechanism just described for the bushings on the lower bushings, the only change being that the handwheel 103 is omitted and the threads on the tubes 95 and screws 96 are reversed to permit the operating shafts 100 to rotate simultaneously in opposite directions. (See Fig. 3.) The upper and lower operating shafts 100 are connected by a vertical shaft 104 having a splined connection with a vertical shaft 105 for permitting telescoping motion as the upper and lower operating shafts 100 move apart or nearer together during the telescoping action of the hangers. The shafts 104 and 105 are connected to the upper and lower operating shafts, respectively, by means of miter gears 106 and 107.

In operation, as the handwheel 103 is rotated, the six clamping screws 96 (three on each operating shaft) are rotated in unison, thereby moving alternate stub tubes 95 forwardly and rearwardly. These tubes cause a corresponding movement of the bushings 89, by means of the screws 94, thereby moving each pair of cooperating hangers, together with the gripping arms, toward each other and actuating the arms to clamp bricks which are between the arms. When the handwheel 103 is turned in the opposite direction these hangers and arms are moved apart. During such movements the hangers are slid along the beams 15 and the tubes 57.

It will be noted that, although the two hangers of each pair are maintained relatively to each other at distances determined by the angular positions of the clamping screws 96, the two forward pairs of hangers are left free to slide as separate units longitudinally along the beams 15 and tubes 57; during such sliding the clamping screws 96 are free to slide along the shafts 98 and 99. The rearmost hanger is connected through its lowest gripping arm 39a to the rack gear 58, (as was shown in section II of this specification) whereby longitudinal sliding thereof is prevented; hence only one of the threaded tubes 95 on the connecting tube 90 slides as the clamping screw 96 associated therewith is rotated. The shafts 98 and 99 are progressively longer than the shaft 97 because the forward pair of hangers must slide a greater distance toward the rear than the intermediate pair during the longitudinal spacing operation described in the succeeding section of this specification. The clamping screw 96 on the shaft 97 slides only when the shaft 100 is rotated. The operating shaft 100 and miter gears 106 and 107 are retained longitudinally with respect to the supporting structure through the rearmost hangers, the bushings 89 mounted thereon, and the screws passing through these bushings, through the holes 90b and the thrust bearing 101 held in the connecting tube 90.

Each of the side frames is provided with a complete clamping mechanism, the two mechanisms being operable independently of each other.

The horizontal torque about the axis of the vertical telescoping hanger imposed by the gripping arms when a pair of cooperating arms is clamped on bricks is transmitted to the bushings 89 on the bushings 41 and 44, and from these bushings to the connecting tubes 90, 91 or 92. There being two such tubes for each pair of cooperating hangers, each of such tubes will be subjected to a bending stress proportional to the torque of approximately half of the pairs of gripping arms, as follows: The upper connecting tube, connected by its bushing 89 to the bushing 41, receives directly the torque of the arm 31, which is attached directly to bushing 41, and receives the torques of arms 28, 29 and 30 through pin 47, (the torques of arms 28 and 29 being transmitted through pin 46). Similarly, the lower connecting tube, connected by its bushing 89 to the bushing 44, receives directly the torque of the arm 36, which is attached directly to section 44, and receives the torque of arm 37, 38 and 39 through pin 50, (the torques of arms 38 and 39 being transmitted through pin 51). The torques of arms 32 to 35, inclusive, is intended to be distributed to the bushings 41 and 44, respectively, through pins 47 and 50, respectively; but since pins 48 and 49 interconnect these parts, the exact distribution of the torques actually attained will depend upon the precision with which the parts are constructed. Since the entire gripping force on all arms save 31 and 36 is transmitted via the pins 46 to 51, it is desirable to construct the pin bushings 52 to 55 of wear resisting materials and of generous dimensions so as to avoid malfunctioning by rapid wear of the pin bushings and consequent misorientation of the arms.

V.—Longitudinal spacing mechanism

The longitudinal spacing mechanism, shown in Figs. 1, 5, 6 and 22–24, comprises an operating shaft 108 journalled in the transverse beams 1; a sprocket 109 fixed to the forward end thereof and driven by a roller chain 110 and sprocket 111; a second sprocket 112 fixed to the same shaft as sprocket 111 and operated manually by an endless link chain 113; bushings 114 and 115 secured to the shaft 108 by set screws; internally threaded translating blocks 116 and 117; transverse bars 118 and 119 welded to blocks 116 and 117, respectively having their ends supported by longitudinal beams 2; and the hanger-engaging device described below. The bushings 114 and 115 are externally threaded with right hand threads, the threads on bushing 114 being double threads, i. e., having twice the pitch of the threads on bushing 115. The blocks 116 and 117 are internally threaded to conform to the threads on the bushings. As the link chain 113 is pulled manually to rotate sprocket 112 in one direction the bars 118 and 119 moved toward the rear, bar 118 moving twice the distance of bar 119; when the direction is reversed, the bars 118 and 119 are similarly returned toward the front of the carrier.

Figure 24:
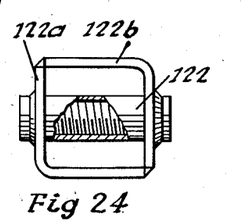
Fig. 24 is a plan view showing a detail of the bushing 122.

The bars 118 and 119 carry slides 120, there being on each bar a separate slide for each side frame. These slides are free to move along the bars as the side frames are opened or closed by the operation of the sprocket 68. Each slide 120 carries a longitudinal shaft 121 provided, on opposite ends, with right hand and left threads, and a square end; it is locked to the slide by means of nuts. A pair of bushings 122 and 123, having right and left hand threads, respectively, are threadedly secured to the shaft 121. As shown in Fig. 24, the bushing 122 carries a cage formed by engaging cross pieces 122a and with longitudinal straps 122b. The bushing 123 has a similar cage comprising cross pieces 123a interconnected by longitudinal straps 123b. Vertical lugs 19a are formed on the bushings 19 of the forward four hangers and have bifurcated ends which extend upwardly into the cage formed by the cross pieces and straps; they have, for example, up to an inch of play longitudinally between the cross pieces 122a (or 123a) within the cages. The hangers are thereby engaged for longitudinal movement along the beam 15 by engagement of the vertical lugs with the cross pieces on the bushings 122 and 123. Engagement of the lateral edges of these same lugs with the longitudinal straps 122b (or 123b) causes the shafts 121 and slides 120 to be moved transversely along the bars 118 and 119 as the side frames are opened and closed.

The spacing between the bushings 122 and 123 can be adjusted by rotating the shafts 121, for the size of the bricks to be carried. This spacing is adjusted so that the lugs 19a on the two hangers forming a cooperating pair for engaging the same tier of bricks will engage the cross pieces 122a and 123a simultaneously when the hangers are in engagement with bricks. In this manner the longitudinal motion of the bars 118 and 119 will cause both hangers of any one cooperating pair of hangers to be engaged through their lugs 19a and binding along the beam 15 will be minimized. When the two hangers of the pair are separated farther apart the lugs 19a will be correspondingly spaced farther apart and only one of the lugs on each pair of hangers will be engaged by one of the bushings (the lug on the rearmost hanger of a pair is engaged by the bushing 122 during the movement toward the rear); but because the hangers are in this case not supporting bricks there is only a small load and binding is less likely.

To prevent binding even in the last-described situation, as well as to guard against inaccurate adjustment of the bushings 122 and 123, the following optional thrust balancing arrangement is provided: Each of the forward four bushings 19 carries a horizontally extending lug 19b. A threaded shaft 124 extends through the lugs of adjoining bushings, being firmly secured to the forward bushing by nuts and to the rear bushing by a stiff spring 125, retained by a washer and a nut on the shaft. The spring is arranged to urge the connected bushings 19 apart. As a result the bushings are urged to move together: For example, when the bars 118 and 119 are moved toward the front, the bushings 122 engage the lugs 19a on the rearmost of the two bushings 19 of a pair of hangers; the spring 125 and shaft 124 transmit the forward thrust to the foremost bushings of the same pair of hangers. Similarly, when the bars are moved toward the rear, the bushings 123 engage the lugs on the foremost of the two bushings 19, and the spring and shaft transmit this thrust to the rearmost bushing. This arrangement adapts the carrier for engaging larger bricks than those for which the shaft 121 was adjusted.

It will be noted that the bars 118 and 119 are able to move the hangers forwardly and rearwardly regardless of the positions of the side frames.

VI.—Operation

Figs. 25 and 26 show 108 bricks 126 supported by 36 pallets 127, the pallets being arranged in six vertical tiers of six pallets each. The tiers of pallets are indicated by letters A to F. The bricks on pallets A and B form the rearmost, transverse row of vertical tiers of bricks, and the bricks on the pallets E and F form the forwardmost row, there being a longitudinal interval between rows of tiers of bricks, i. e., an interval between the row containing tiers A and B and the row containing tiers C and D, and a similar interval between the latter toward the row containing tiers E and F. The tiers A, C and E form one longitudinal column of tiers of pallets, and the tiers B, D and F form another column. There being three bricks on each pallet, the bricks form six parallel longitudinal columns of tiers of bricks, and there are vertical intervals between bricks within each tier. Such pallets may be supported by any rack, not shown, which may, for example, be an adjustable rack of the type described in my aforesaid patent application. The method according to the present invention involves the following operations:

(a) Clamping the bricks.

(b) Lifting all bricks off their pallets (or lowering the pallets).

(c) Separating the bricks and pallets by a relative longitudinal motion, i. e., either by moving the pallets and their supporting rack horizontally away from the clamped bricks, or moving the clamped bricks away from the pallets.

Figure 27:
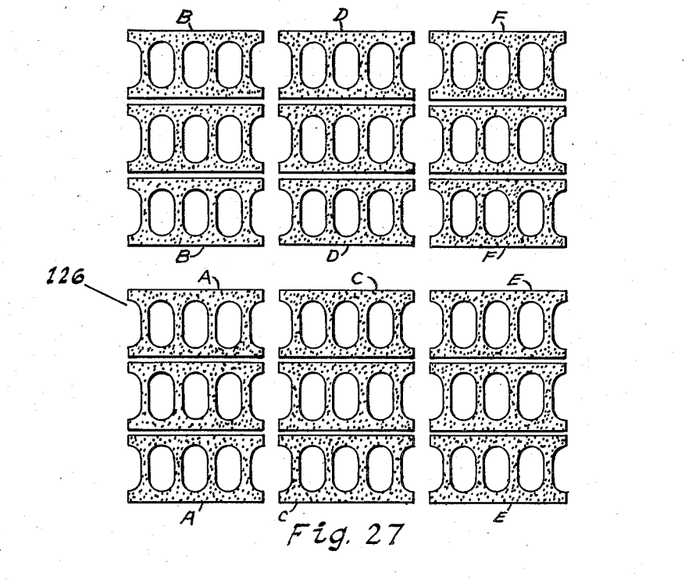

(d) Reducing the longitudinal interval between the tiers of bricks; in the embodiment shown, wherein the tiers are arranged in a plurality of rows, this step involves moving the rows together, resulting in the reduced longitudinal spacing shown in Fig. 27.

(e) Eliminating the vertical intervals between the bricks progressively from the bottom.

(f) Unclamping the bricks.

Figure 28:
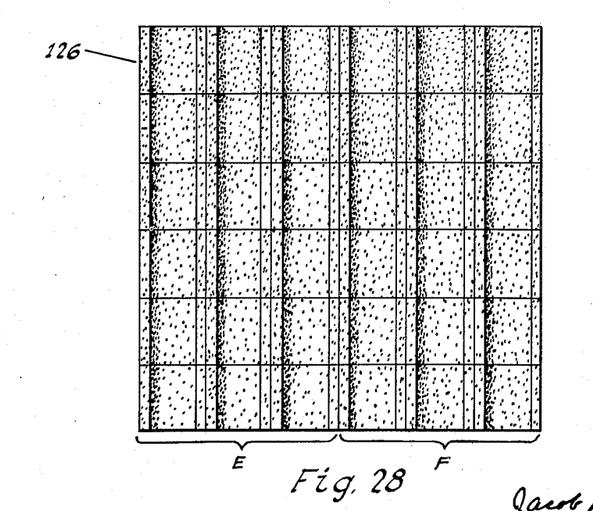

(g) Reducing or eliminating the lateral spacing or interval between the columns by moving the columns inwardly, resulting in the arrangement shown in Fig. 28. This step is optional and may, in certain cases, be omitted.

The foregoing operations or steps are performed by the telescoping carrier and spacing machine as follows:

The first operation is to open the side frames by means of the chain 69 and sprocket 66 to separate the gripping arms on the opposed frames to permit the bricks to be enveloped. In one method of using the device, it is suspended from a monorail or bridge crane and is lowered over the bricks, or moved horizontally and longitudinally in its open position until the gripping arms are opposite the transverse spaces between the bricks. Centering of the device over the bricks while being lowered may be facilitated by providing centering plates 128 (see Fig. 2) secured to the upper rigid structure. These plates have inclined lower edges which are adapted to engage a rack or a part of the crane or monorail structure supporting such rack (not shown) on which the pallets and bricks are supported. The vertical position of my device after being lowered is such that two gripping arms on each hanger are at the level of each layer of bricks.

The second operation is to close the side frames by means of the chain 69 and sprocket 66. The frames are not closed completely, but only sufficiently to cause the gripping arms to be opposite three bricks of each row (as shown in Fig. 25), leaving a lateral space between the ends of the arms on opposite sides. This permits a rack supporting the pallets which has a central row of vertical supporting columns to be moved longitudinally away from the carrier after the bricks have been lifted.

The third operation (corresponding to the first step of the method) is to clamp the bricks by rotating the handwheels 103 on the two frames. This causes each two pairs of cooperating gripping arms on adjacent hangers to engage three bricks.

The fourth operation is to lift the carrier an inch or so, thereby lifting the bricks off the pallets. Alternatively, the pallets can be lowered. This corresponds to the second step of the method.

The fifth operation (corresponding to the third step of the method) involves a longitudinal separation of the pallets from the bricks, for example, by moving the carrier along an overhead rail to separate it from the pallets. The carrier may then be moved to any desired point in the brick storage yard. As was stated in section IV, the supporting plates 88 and brackets 84 for the arms on the rearmost hangers are rectangular. This facilitates the positioning of the carrier in the yard with relation to a previously deposited stack of bricks: the carrier is moved rearwardly until these plates and brackets engage the forward row of the previously deposited bricks. This results in the uniform longitudinal spacing of bricks in the yard.

The sixth operation (resulting in the accomplishment of the fourth step of the method), is to rotate the sprocket 112 by means of the chain 113 in the direction to cause the bars 118 and 119 to move toward the rear. The bricks in the rearmost row remain stationary; the intermediate row is moved toward the rear to the extent permitted by the widths of the gripping arms; and the forwardmost row is moved twice as far as the intermediate row, due to the steeper pitch of the threads on the bushing in relation to those on the bushing 115.

The seventh operation is to lower the carrier to the ground. After the lowest layer of bricks has come to rest on the ground or other support the lowering movement is continued, whereby the fifth step of the method is performed. During this continued movement the vertical intervals are progressively eliminated in the manner previously described in section II of this specification. During this operation the tubes 9 are gradually telescoped with respect to the tubes 7, and the shafts 71 and 73, 81 and 82, and 104 and 105 are similarly telescoped.

The eighth operation, corresponding to the sixth step of the method, is to unclamp the bricks by operating the handwheels 103.

The ninth operation, which is optional, is to reduce the lateral intervals between the columns; it corresponds to the seventh step of the method. This is effected by closing the side frames by further operation of the sprocket 66. The outer rows of bricks at each layer are thereby engaged by the plates 88 at the outer ends of the gripping arms, and the bricks are slid together. In this movement the opposed gripping arms on the opposite side frames overlap.

The tenth operation is to lift the carrier from the resulting stack of bricks, after partially or entirely opening the side frames.

When some or all of the bricks are of smaller size, the smaller bricks will be engaged by only one gripping arm on each of the two cooperating hangers. It is possible when dealing with smaller bricks, to arrange the pallets vertically at half of the spacings shown in Fig. 26, using twelve layers; the arrangement shown in Fig. 25 is not altered. The ten operations just described are in this case identical; the only difference in the functioning of the machine is that twelve layers of bricks are clamped and lifted and that the telescoping action involves the successive closing of eleven instead of five vertical intervals, as described previously in section II.

While I have, for purposes of illustration, described a preferred embodiment of the invention, having six hangers on each side frame and twelve clamping or gripping arms on each hanger, it is evident that these are merely exemplary of the invention and that I may practice the invention by using other embodiments, using a greater or smaller number of tiers or gripping arms, and that the carrier may be constructed of but a single side frame instead of with two opposed side frames. The method described herein is claimed in a divisional application Ser. No. 282,327 filed April 15, 1952.

I claim as my invention:

1. A telescoping carrier comprising a plurality of vertically spaced pairs of cooperating clamping elements adapted to clamp a series of vertically spaced bricks simultaneously by clamping engagement with the sides thereof so as to leave the space between the clamping elements free throughout the height of said series of bricks for relative vertical movement of the clamped bricks into contacting positions, means for actuating said clamping elements, and supporting means for said clamping elements comprising relatively movable elements connected to move to predetermined, vertically separated positions and increase the vertical intervals between said bricks when the supporting means is lifted and freely vertically movable toward each other to reduce the vertical intervals between said bricks when lowered to engage a support.

2. A telescoping carrier comprising a pair of hangers supported from their upper ends, each hanger comprising a plurality of telescoping sections movable vertically relatively to one another to predetermined relative positions and freely vertically movable toward each other from said predetermined positions, a plurality of clamping elements on said hangers distributed among the telescoping sections and movable vertically therewith for engaging the sides of a series of vertically spaced objects, and means for actuating said clamping elements by moving said hangers one with respect to the other.

3. The carrier according to claim 2 wherein the means for actuating the clamping elements comprises a plurality of substantially horizontal, expansible and contractible connections between the hangers at different levels thereof and means for expanding and contracting said connections in unison.

4. The carrier according to claim 2 wherein the hangers are provided with horizontal bushings and a substantially horizontal shaft slidable with respect to said bushings and adapted to oppose the torque of the clamping means.

5. The carrier according to claim 2 wherein some of the clamping elements are secured to elements mounted on said telescoping sections for free sliding movement thereon from predetermined relative positions.

6. A telescoping carrier comprising an upper, horizontal supporting beam and a lower horizontal beam, a pair of telescoping hangers, at least one of said hangers being longitudinally slidable on said beams, each hanger comprising a plurality of telescoping sections, a plurality of gripping arms on each of said hangers spaced vertically thereon on different telescoping sections thereof to form a plurality of pairs of cooperating gripping arms, said telescoping sections being provided with means for transmitting torque from said gripping arms from section to section, means for opposing the torque on the hangers resulting when the gripping arms clamped on bricks between the cooperating gripping arms, and means for moving said hangers longitudinally for changing the spacing between said cooperating gripping arms.

7. In combination with the carrier according to claim 6, a plurality of bushings on said telescoping hangers, gripping arms on said bushings, said bushings being vertically slidable with respect to the telescoping sections and provided with means for transmitting torque from said arms to the hanger.

8. A telescoping carrier comprising an upper, horizontal supporting beam and a lower horizontal beam, a plurality of pairs of vertical telescoping hangers, at least one hanger of each pair being slidably mounted on said beams, a plurality of vertically spaced gripping arms on each of said hangers to form, on each pair of hangers, a plurality of pairs of cooperating gripping arms, and means connecting said hangers for moving the hangers of each pair together or apart.

9. The telescoping carrier according to claim 8 wherein the means for moving the hangers comprises a pair of horizontal shafts at different levels, a connection for driving said shafts in unison, and threaded elements on said shafts connected to the hangers for moving the hangers together or apart as said horizontal shafts are rotated.

10. An actuating mechanism for moving a plurality of pairs of hangers together or apart comprising a bushing on each of said hangers, a connecting tube for each pair of hangers secured to said bushings to transmit torque about a vertical axis, at least one bushing on each pair of hangers being slidably fitted with respect to its respective connecting tube, a pair of internally threaded tubes having opposed threads within each connecting tube, each internally threaded tube being connected to one of said bushings and at least one of said internally threaded tubes being slidably mounted within its connecting tube, a clamping screw having opposed threads connected to each pair of internally threaded tubes, and an operating shaft for said clamping screws.

11. The actuating mechanism according to claim 10 wherein each pair of internally threaded tubes within a common connecting tube is secured against rotation relatively to said connecting tube, said connecting tube being secured against rotation about the axis thereof relatively to said hangers.

12. An actuating mechanism for moving a plurality of pairs of telescoping hangers together or apart, said pairs of hangers being longitudinally movable with respect to each other, comprising a pair of bushings on two relatively telescopable sections of each hanger forming two longitudinal rows of bushings, a connecting tube for each pair of hangers in each of said rows of bushings disposed within said bushings, at least one bushing to transmit torque about vertical axes between said bushings on each connecting tube being slidably fitted with respect the connecting tube, a pair of internally threaded tubes having opposed threads within each connecting tube, each internally threaded tube being connected to one of said bushings and at least one of said internally threaded tubes being slidably mounted within its connecting tube, a clamping screw having opposed threads connected to each pair of internally threaded tubes, a pair of operating shafts, each operating shaft extending through all clamping screws of the same row of bushings connected for rotating said clamping screws, at least some of said clamping screws being slidable along said operating shaft, and means interconnecting said operating shafts for rotation in unison arranged to permit said operating shafts to be moved apart or together as the telescoping carriers are extended or telescoped.

13. The actuating means according to claim 12 wherein the means interconnecting the operating shafts comprises miter gears at the ends of said shafts and splined shafts joining the miter gears.

14. A carrier for unloading bricks or the like comprising a supporting frame, a movable side frame on each side of the center of the supporting frame, each of said movable side frames having a pair of vertical hangers provided with inwardly extending gripping arms, means for actuating said gripping arms, and means on said supporting frame for moving said side frames apart or together.

15. A carrier for unloading bricks or the like comprising a supporting frame, a pair of movable side frames, one on each side of the center of the supporting frame, each of said movable side frames having a pair of vertical hangers provided with inwardly extending gripping arms, means for actuating said gripping arms, rack gears at the top and bottom of each of said side frames, pinion gears on the supporting frame meshing with said rack gears, and means for driving said pinion gears in unison for moving said side frames simultaneously apart or together.

16. A telescoping carrier comprising a supporting structure having a rigid, upper frame and a vertically telescoping bottom section, a pair of movable side frames, each of said movable side frames having a pair of vertically telescoping hangers comprising a plurality of relatively telescoping sections, a plurality of gripping arms on each hanger extending inwardly and distributed among said sections, means for actuating said gripping arms, and means for simultaneously translating said side frames comprising a driving connection between the rigid, upper frame and the top of each side frame and a driving connection between the telescoping, bottom section and the bottom of each side frame.

17. A carrier for spacing bricks or the like comprising a supporting frame, a pair of longitudinal supporting beams mounted thereon for lateral movement, a plurality of pairs of hangers suspended from each of said supporting beams and arranged for longitudinal movement along said beams, a lower longitudinal beam connecting the lower ends of the hangers suspended from the same supporting beams for longitudinal movement of the hangers thereon, each supporting beam, the hangers suspended therefrom, and the lower longitudinal beam associated therewith forming a movable side frame, gripping arms on each of said hangers extending inwardly, means for actuating said gripping arms, means on said supporting frame engaging each side frame at its top and bottom for moving said frames apart or together, and means for translating said pairs of hangers along the supporting beams and lower beams for varying the longitudinal interval between said pairs.

18. A carrier for spacing bricks or the like comprising a supporting frame, a movable side frame on each side of the supporting frame, each of said side frames having a pair of inwardly extending gripping arms, means for actuating said gripping arms, engaging surfaces on said gripping arms disposed transversely to said arms and near their points of attachment to said side frames, and means on said supporting frame for moving the side frames apart or together, whereby said engaging surfaces are adapted to engage the lateral faces of bricks or the like for reducing the longitudinal interval between the bricks.

19. The carrier according to claim 18 wherein the gripping arms on opposite side frames are in alignment and have their ends chamfered to permit overlapping of the arms when the side frames are moved together.

20. A carrier for spacing bricks or the like comprising a supporting frame, a laterally movable frame mounted thereon. said laterally movable frame comprising a plurality of longitudinally spaced and longitudinally movable clamping means, means for actuating said clamping means, a transverse bar on said supporting frame arranged for longitudinal movement with respect thereto, means for moving said bar longitudinally along said frame, and means slidable laterally along said bar together with said movable frame for moving at least one of said clamping means longitudinally together with said bar.

21. A carrier for spacing bricks or the like comprising a supporting frame, a laterally movable frame mounted thereon, said laterally movable frame comprising a plurality of vertically spaced tiers of clamping means, said tiers of clamping means being longitudinally spaced along said frame and longitudinally movable with respect thereto, means for actuating said clamping means, a transverse bar on said supporting frame arranged for longitudinal movement with respect thereto, means slidable laterally along said bar together with said lateral frame for moving at least one of said tiers of clamping means longitudinally together with said bar, and means for translating said bar longitudinally along said frame.

22. A carrier for spacing bricks or the like comprising a supporting frame, a laterally movable frame mounted thereon, said laterally movable frame comprising a plurality of longitudinally spaced and longitudinally movable clamping means, means for actuating said clamping means, a pair of transverse bars on said supporting frame arranged for longitudinal movement with respect thereto, means for moving said bars longitudinally toward one another, and slidable means on each of said bars slidable laterally along said bars together with said movable frame for moving different clamping means together longitudinally together with said bars.

23. The carrier according to claim 22 wherein the means for moving said bars comprises a longitudinal shaft and threaded connections between said shaft and bars.

24. A carrier for spacing bricks or the like comprising a supporting frame, a plurality of pairs of hangers longitudinally movable along said frame, gripping arms extending laterally from said hangers, means for moving the hangers of each pair together for clamping bricks or the like, a slide movable longitudinally on said frame and means on said slide for engaging both hangers of one said pair of hangers for moving the said hangers in unison longitudinally with respect to the frame.

25. The carrier according to claim 24 wherein the means for engaging the hangers comprises a lug on each hanger, a cage having means for engaging said lugs with longitudinal play, and an adjustable longitudinal shaft on said slide for supporting said cages at adjustable distances from said slide.

26. The carrier according to claim 25 wherein the hangers of said pair of hangers provided with lugs are provided further with resilient means urging the hangers apart.

27. A carrier for spacing bricks or the like comprising a supporting frame, a pair of laterally movable frames mounted thereon, said laterally movable frames comprising a plurality of longitudinally spaced and longitudinally movable clamping means, means for actuating said clamping means, a transverse bar on said supporting frame arranged for longitudinal movement with respect thereto, means for moving said bar longitudinally, a pair of slides on said bar slidable laterally along said bar as said side frames are moved laterally, and a connection between said slides and the clamping means on the corresponding movable frame for moving the connected clamping means longitudinally within the movable frame as said bar is translated.

28. A telescoping carrier and spacing machine comprising a supporting structure having a rigid, upper frame and a vertically telescoping bottom section, a pair of longitudinal supporting beams on the upper frame mounted thereon for lateral movement, a plurality of pairs of hangers suspended from each of said supporting beams and mounted for longitudinal movement along said beams, said hangers having a plurality of vertically telescopable sections, a lower longitudinal beam connecting the lower ends of the hangers suspended from the same supporting beam for longitudinal movement of the hangers thereon, each supporting beam, the hangers suspended therefrom, and the lower longitudinal beam associated therewith forming a movable side frame, gripping arms on each of said hangers extending inwardly and distributed over the telescoping sections thereof, means for sliding the hangers and the gripping arms of the several pairs of hangers together for clamping a brick or the like, means at the top and bottom of each movable side frame for translating the frames laterally with respect to the supporting structure, a transverse bar on said supporting structure arranged for longitudinal movement with respect thereto, a pair of slides on said transverse bar slidable along said bar as the movable side frames are translated, and a connection between at least one pair of hangers on each of said movable side frames and said slides for moving the respective pairs of hangers along said supporting beam and lower longitudinal beam as said transverse bar is moved longitudinally.

JACOB D. NAILLON.

References Cited in the file of this patent

UNITED STATES PATENTS

| Number | Name | Date |
|---|---|---|
| 580,655 | Thew | Apr. 13, 1897 |
| 1,332,168 | Dickinson | Feb. 24, 1920 |
| 1,335,344 | Luce | Mar. 30, 1920 |
| 1,373,513 | Ladd | Apr. 5, 1921 |
| 1,413,225 | Hemstreet | Apr. 18, 1922 |
| 1,503,452 | Fuller | July 29, 1924 |
| 1,543,752 | Dickinson | June 30, 1925 |
| 1,601,868 | Luce | Oct. 5, 1926 |
| 2,177,525 | Henderson | Oct. 24, 1939 |
| 2,467,113 | Deiters | Apr. 12, 1949 |

FOREIGN PATENTS

| Number | Country | Date |
|---|---|---|
| 492,819 | Germany | Feb. 27, 1930 |